(12) United States Patent
Lv et al.

(10) Patent No.: US 12,223,590 B2
(45) Date of Patent: Feb. 11, 2025

(54) DISPLAY PROCESSING METHOD AND DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Yaoyu Lv, Beijing (CN); Zhanshan Ma, Beijing (CN); Jiankang Sun, Beijing (CN); Yachong Xue, Beijing (CN); Lili Chen, Beijing (CN); Hao Zhang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 17/907,090

(22) PCT Filed: Aug. 16, 2021

(86) PCT No.: PCT/CN2021/112658
§ 371 (c)(1),
(2) Date: Sep. 22, 2022

(87) PCT Pub. No.: WO2022/068430
PCT Pub. Date: Apr. 7, 2022

(65) Prior Publication Data
US 2024/0221297 A1    Jul. 4, 2024

(30) Foreign Application Priority Data
Sep. 30, 2020    (CN) .......................... 202011061769.6

(51) Int. Cl.
*G06T 17/00*    (2006.01)
*G06T 13/40*    (2011.01)

(52) U.S. Cl.
CPC .............. *G06T 17/00* (2013.01); *G06T 13/40* (2013.01)

(58) Field of Classification Search
None
See application file for complete search history.

(56) References Cited

U.S. PATENT DOCUMENTS

2005/0275628 A1    12/2005    Balakrishnan et al.
2015/0262419 A1    9/2015    Maa

FOREIGN PATENT DOCUMENTS

CN    102055996 A    5/2011
CN    103295260 A    9/2013
(Continued)

OTHER PUBLICATIONS

Research on True 3D Volumetric Display Technique Based on the Rotation of a Display Panel, by Zhang Jun, published on Dec. 2008. (Year: 2008).*

(Continued)

*Primary Examiner* — Nurun Flora
(74) *Attorney, Agent, or Firm* — McCoy Russell LLP

(57) ABSTRACT

A display processing method and device are provided. The method is applied to a rotatable three-dimensional display device including a rotatable display panel, the method includes: obtaining model information about an image model in a to-be-displayed image, the image model including one or more attribute sets including triangular faces constituting the image model; traversing coordinate information about vertices of each triangular face in each attribute set according to association relationship among the attribute sets; generating display data for the display panel at (Continued)

each phase according to the coordinate information about the vertices of each triangular face; and displaying an image according to the display data at each phase when the display panel is at the each phase.

17 Claims, 6 Drawing Sheets

(56) References Cited

FOREIGN PATENT DOCUMENTS

| CN | 103871094 A | 6/2014 |
|---|---|---|
| CN | 104732592 A | 6/2015 |
| CN | 108986157 A | 12/2018 |
| CN | 109358430 A | 2/2019 |
| CN | 109872390 A | 6/2019 |
| CN | 110996093 A | 4/2020 |
| CN | 112200892 A | 1/2021 |

OTHER PUBLICATIONS

Jun, Z., "Research on True 3D Volumetric Display Technique Based on the Rotation of a Display Panel," Master Of Engineering, Biomedical Engineering Thesis, Graduate School College of Automation Engineering, Nanjing University of Aeronautics and Astronautics, Dec. 2008, 126 pages. (Submitted with Partial English Translation).

Xia, G. et al., "Data Generation Method of True 3D Volumetric Display," Chinese Journal of Liquid Crystals and Displays, vol. 24, No. 2, Apr. 2009, 11 pages. (Submitted with English Translation).

Xianyin, D., "Image Data Generation for Volumetric 3D Display," Master of Engineering Science Dissertation, School of Electromechanical Engineering, Guangdong University of Technology, May 2011, 120 pages. (Submitted with Partial English Translation).

Zhiyuan, H., "Preprocessing of 3D Model for Volumetric 3D Display," Master of Engineering Science Dissertation, School of Electromechanical Engineering, Guangdong University of Technology, Jun. 2012, 109 pages. (Submitted with Partial English Translation).

Sun, C. et al., "An Improved Design of 3D Swept-Volume Volumetric Display," Journal of Computers, vol. 9, No. 1, Jan. 2014, 8 pages.

ISA China National Intellectual Property Administration, International Search Report and Written Opinion Issued in Application No. PCT/CN2021/112658, Nov. 17, 2021, WIPO, 16 pages. (Submitted with Partial English Translation).

\* cited by examiner

DISPLAY PROCESSING METHOD AND DEVICE

CROSS-REFERENCE TO RELATED APPLICATION

The present application is a U.S. National Phase of International Application No. PCT/CN2021/112658 entitled "DISPLAY PROCESSING METHOD AND DEVICE," and filed on Aug. 16, 2021. International Application No. PCT/CN2021/112658 claims priority to Chinese Patent Application No. 202011061769.6 filed on Sep. 30, 2020. The entire contents of each of the above-listed applications are hereby incorporated by reference for all purposes.

TECHNICAL FIELD

The present disclosure relates to the field of display technologies, and in particular, relates to a display processing method and a display processing device.

BACKGROUND

A rotatable three-dimensional (3D) display device is a display device which generates 3D display space through high-speed rotation of a display panel in combination with persistence of vision of human eyes, so as to achieve a 3D display effect. In use, it is necessary to determine displayed data of a to-be-displayed model at each phase of the display panel. In the related art, the processing of displayed data is relatively complicated, and a large quantity of resources need to be occupied to complete the processing of the displayed data.

SUMMARY

Embodiments of the present disclosure provide a display processing method and a display processing device.

In a first aspect, the embodiments of the present disclosure provide a display processing method applied to a rotatable three-dimensional display device, the rotatable three-dimensional display device includes a rotatable display panel, the display processing method includes: obtaining model information about an image model in a to-be-displayed image, wherein the image model includes one or more attribute sets, each of the one or more attribute sets includes a plurality of triangular faces constituting the image model; traversing coordinate information about vertices of each triangular face in each attribute set in accordance with association relationship among the attribute sets; generating display data for the display panel at each phase in accordance with the coordinate information about the vertices of each triangular face; and displaying an image in accordance with the display data at each phase when the display panel is at the each phase.

In some embodiments, the attribute set is a material set, and triangular faces in each material set have a same material attribute.

In some embodiments, the image model includes N attribute sets, N is a positive integer; traversing the coordinate information about the vertices of each triangular face in each attribute set includes: determining a root node of the image mode; indexing a first attribute set in accordance with index relationship between the root node and the first attribute set, and obtaining coordinate information about vertices of each triangular face in the first attribute set; and in case that N is greater than 1, indexing an Mth attribute set in accordance with index information included in an (M−1)th attribute set, and obtaining coordinate information about vertices of each triangular face in the Mth attribute set, and obtaining the coordinate information about the vertices of the triangular faces in all the attribute sets, M is a positive integer smaller than or equal to N and greater than 1.

In some embodiments, the image model in the to-be-displayed image is a dynamic model and includes a plurality of joint nodes. Traversing the coordinate information about the vertices of each triangular face in each attribute set further includes: obtaining animation frame information about the image model; calculating coordinate information about each joint node within each animation frame in accordance with the animation frame information; and calculating model coordinates of each vertex of each triangular face in accordance with the coordination information about the joint node.

In some embodiments, the image model further includes bones and skins, each of the bones is located between two adjacent joint nodes, and the skins are bound to the bones and are constituted by at least one of the attribute sets. Calculating the model coordinates of each vertex of each triangular face in accordance with the coordinate information about the joint node includes: determining coordinate information about each bone in accordance with the coordinate information about the joint node; and calculating the coordinate information about each vertex of each triangular face in accordance with the coordinate information about the bone and binding relationship between the skin and the bone.

In some embodiments, traversing the coordinate information about the vertices of each triangular face in each attribute set includes: determining device coordinates of each vertex of each triangular face, the device coordinates being coordinates in a device coordinate system established on basis of the rotatable three-dimensional display device; and generating sign information about each vertex in accordance with phase information about the display panel and the device coordinates, the sign information being configured to mark positional relationship between each vertex of the triangular face and each phase of the display panel during rotation.

In some embodiments, determining the device coordinates of each vertex of each triangular face includes: obtaining model coordinates of each vertex of each triangular face, the model coordinates being coordinates in an image model coordinate system; calculating scene coordinates of each vertex of each triangular face in accordance with the model coordinates, the scene coordinates being coordinates in an image scene coordinate system; and calculating the device coordinates of each vertex of each triangular face in accordance with the scene coordinates.

In some embodiments, generating the display data for the display panel at each phase in accordance with the coordinate information about the vertices of each triangular face includes: determining an intersection line of the display panel with the triangular face at each phase in accordance with the sign information about the triangular face; and generating the display data for the display panel at a corresponding phase in accordance with the intersection line.

In a second aspect, the embodiments of the present disclosure provide a display processing device for controlling a rotatable three-dimensional display device, the rotatable three-dimensional display device including a rotatable display panel, the display processing device includes: a model-information obtaining module configured to obtain model information about an image model in a to-be-displayed image, wherein the image model includes one or more attribute sets, each of the one or more attribute sets includes a plurality of triangular faces constituting the image model; a coordinate-information traversing module configured to traverse coordinate information about vertices of each triangular face in each attribute set in accordance with association relationship among the attribute sets; a display-data generation module configured to generate display data for the display panel at each phase in accordance with the coordinate information about the vertices of each triangular face; and a display module configured to display an image in accordance with the display data at each phase when the display panel is at the each phase.

In some embodiments, the image model includes N attribute sets, N is a positive integer, the coordinate-information traversing module includes: a root-node determination sub-module configured to determine a root node of the image mode; and an indexing sub-module configured to index a first attribute set in accordance with index relationship between the root node and the first attribute set, and obtain coordinate information about vertices of each triangular face in the first attribute set; wherein the indexing sub-module is further configured to, in case that N is greater than 1, index an $M^{th}$ attribute set in accordance with index information included in an $(M-1)^{th}$ attribute set, and obtain coordinate information about vertices of each triangular face in the $M^{th}$ attribute set, and obtain the coordinate information about the vertices of the triangular faces in all the attribute sets, M is a positive integer smaller than or equal to N and greater than 1.

In some embodiments, the image model in the to-be-displayed image is a dynamic model and includes a plurality of joint nodes, the coordinate-information traversing module further includes: an obtaining sub-module configured to obtain animation frame information about the image model; a coordinate-information calculation sub-module configured to calculate coordinate information about each joint node within each animation frame in accordance with the animation frame information; and a model-coordinate calculation sub-module configured to calculate model coordinates of each vertex of each triangular face in accordance with the coordination information about the joint node.

In some embodiments, the image model further includes bones and skins, each of the bones is located between two adjacent joint nodes, and the skins are bound to the bones and are constituted by at least one of the attribute sets. The model-coordinate calculation sub-module includes: a bone-coordinate calculation unit configured to determine coordinate information about each bone in accordance with the coordinate information about the joint node; and a vertex-coordinate calculation unit configured to calculate the coordinate information about each vertex of each triangular face in accordance with the coordinate information about the bone and binding relationship between the skin and the bone.

In some embodiments, the coordinate-information traversing module includes: a device-coordinate calculation sub-module configured to determine device coordinates of each vertex of each triangular face, the device coordinates being coordinates in a device coordinate system established on basis of the rotatable three-dimensional display device; and a sign-information generation sub-module configured to generate sign information about each vertex in accordance with phase information about the display panel and the device coordinates, the sign information being configured to mark positional relationship between each vertex of the triangular face and each phase of the display panel during rotation.

In a third aspect, the embodiments of the present disclosure provide an electronic device. The electronic device includes: a processor, a memory, and a computer program stored on the memory and executable by the processor, wherein when the computer program is executed by the processor, the processor implements steps of the display processing method according to the first aspect.

In a fourth aspect, the embodiments of the present disclosure provide a computer-readable storage medium storing therein a computer program, wherein when the computer program is executed by a processor, the processor implements the steps of the display processing method according to the first aspect.

In a fifth aspect, the embodiments of the present disclosure provide a display system. The display system includes a rotatable three-dimensional display device and the display processing device according to the second aspect, wherein the rotatable three-dimensional display device includes a rotatable display panel, and the display processing device is configured to control the rotatable three-dimensional display device to display an image.

BRIEF DESCRIPTION OF THE DRAWINGS

In order to illustrate technical solutions of the embodiments of present disclosure in a clearer manner, drawings to be used in description of the embodiments the present disclosure will be described hereinafter briefly. Obviously, the following drawings merely relate to some embodiments of the present disclosure, and based on these drawings, a person skilled in the art may obtain the other drawings without any creative effort.

DETAILED DESCRIPTION

The technical solutions in the embodiments of the present disclosure will be described hereinafter in a clear and complete manner in conjunction with the drawings in the embodiments of the present disclosure. Obviously, the following embodiments merely relate to a part of, rather than all of, the embodiments of the present disclosure, and based on these embodiments, a person skilled in the art may, without any creative effort, obtain other embodiments, all of which also fall within the protection scope of the present disclosure.

Figure 1:
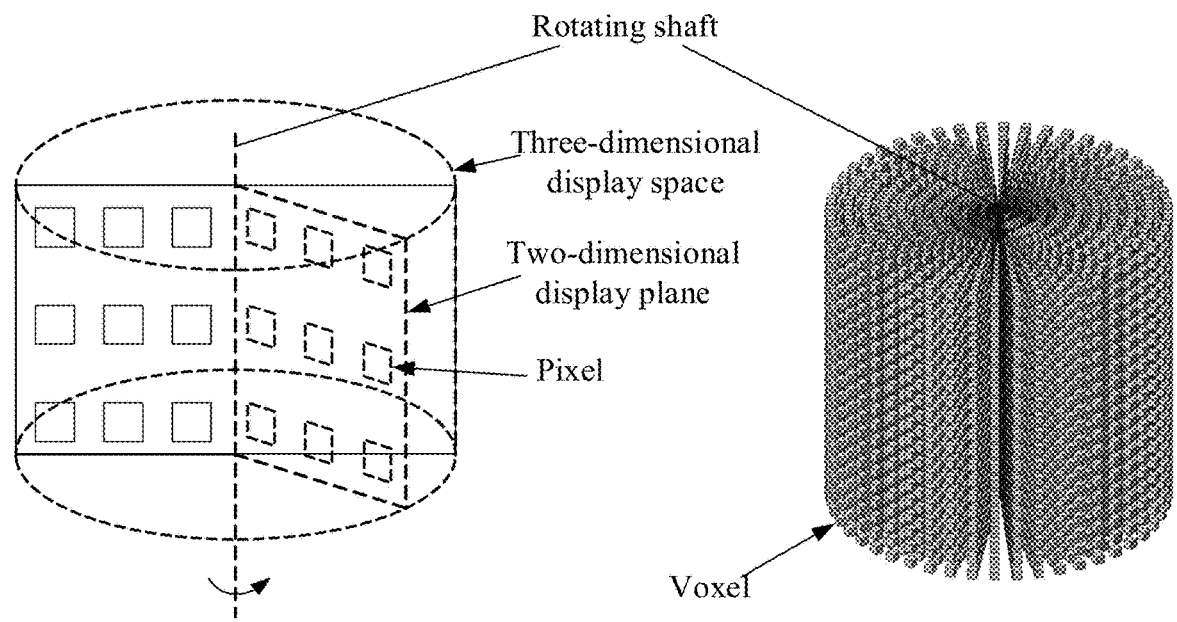
FIG. 1 is a structural schematic diagram of a rotatable 3D display device according to an embodiment of the present disclosure.

The present disclosure provides in some embodiments a display processing method applied to a rotatable 3D display device. As shown in FIG. 1, the rotatable 3D display device includes a display panel, which can be configured to be rotatable. The display processing method and the display processing device provided in the present disclosure may solve the problem in the related art that processing display data is relatively complicated and a large quantity of resources need to be occupied.

In a possible embodiment of the present disclosure, one end of the display panel is secured onto a rotating shaft. During the implementation, through driving the rotating shaft to rotate, it is able to drive the display panel to rotate about the rotating shaft.

Obviously, in some other embodiments of the present disclosure, the display panel is driven to rotate in other ways. For example, the display panel is secured onto a rotatable seat. In this way, the display panel can also be driven to rotate.

Referring to FIG. 1, when the rotating shaft is located at one side of the display panel, the display panel is driven to rotate about the rotating shaft by the rotating shaft, so as to form a cylindrical display space. Each time the screen of the display panel rotates for one circle, an image frame is refreshed once. Since the image frame is displayed in a 3D manner, so in this embodiment of the present disclosure, each image frame is called as a volume frame.

Generally speaking, persistence of vision for human eyes requires a frame rate of the volume frame to be not smaller than 24 Hz, so at least 24 volume frames need to be refreshed by the display panel per second, i.e., a rotational speed of the display panel needs to be not smaller than 24 revolutions per second (24 r/s).

Further, contents displayed by the display panel at different positions are different, so it is necessary to define a plurality of phases, and the display panel displays different contents at different phases. In the embodiments of the present disclosure, one phase is defined as two degrees, so each volume frame has 180 phases corresponding to 180 cross-section images. Hence, a refreshing rate of the display panel is not smaller than 180*24=4320 Hz.

Obviously, during the implementation, the quantity of phases may be increased or decreased, and the rotational speed of the display panel may also be adjusted adaptively. Further, the refreshing rate of the display panel may be determined in accordance with the rotational speed and the quantity of phases of the display panel.

A resolution of the screen of the display panel is width*height, where width represents a horizontal resolution, and height represents a longitudinal resolution. A distance between centers of two adjacent pixels is pitch, and a length of a side of each pixel is side. When a pixel of the screen rotates about the rotating shaft, a display position of the pixel in the space is called as a voxel of each volume frame.

During the implementation of the technical solution of the present disclosure, it is found by the inventors of the present disclosure that, in order to generate display data, a size of display space for the rotatable 3D display device may be determined first.

As shown in FIG. 1 in which the display panel rotates about its one end, when the display panel is in a stationary state, a display area of the display panel forms a two-dimensional (2D) display plane. When the display panel rotates, cylindrical display space is formed. A radius of the cylindrical display space is a width of the display panel, and a height of the cylindrical display space is a height of the display panel.

Next, an image mode is translated and scaled so that the entirety of the image model is located within the display space.

Further, an image to be displayed by the display panel at each phase is determined in accordance with the image model, and when the display panel has moved to a corresponding phase, the image to be displayed by the display panel at the corresponding phase is displayed.

However, during processing display data, a meshing operation for the model needs to be performed to the image corresponding to each phase, so as to obtain the corresponding display data. When the image to be displayed is a dynamic image including a plurality of animation frames, a plurality of meshing operations to the model needs to be performed to each animation frame, so a computational load is relatively large.

The following technical solutions are further proposed in the present disclosure by the inventors.

Figure 2:
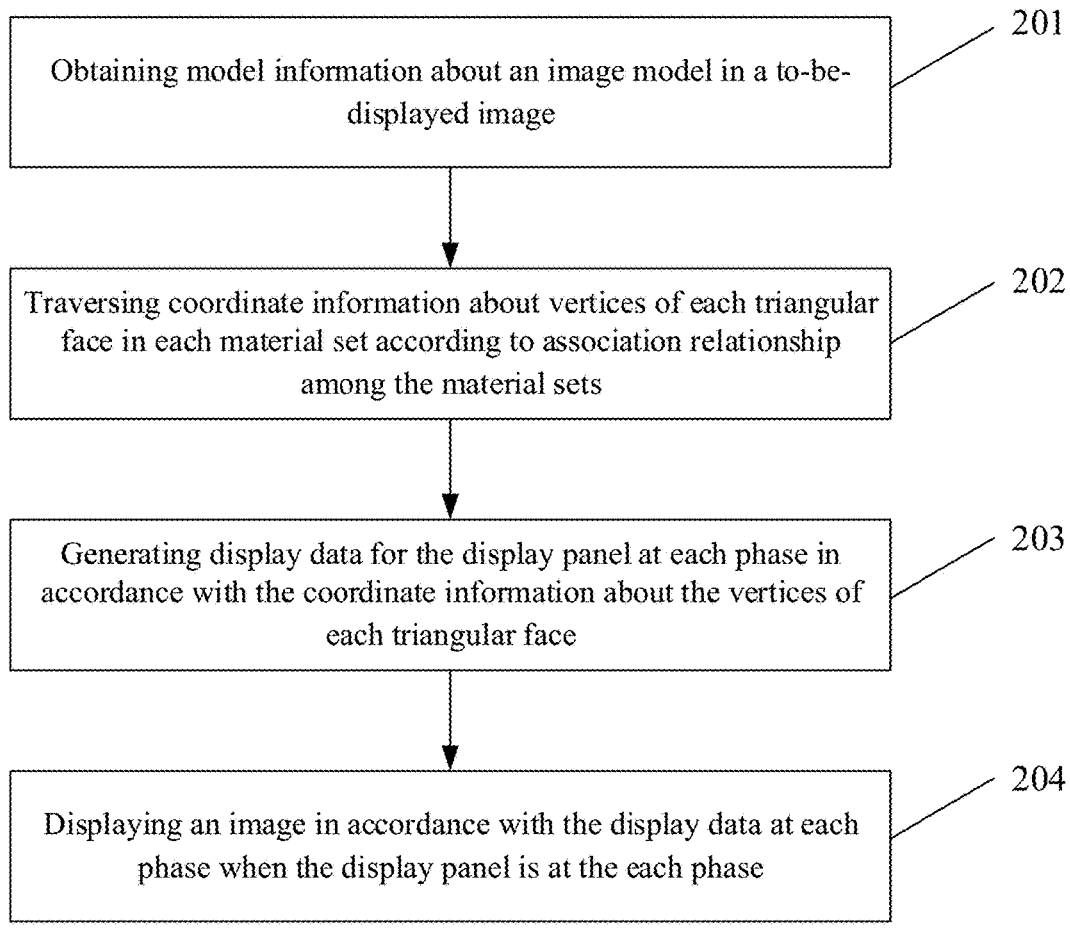
FIG. 2 is a flow chart of a display processing method according to an embodiment of the present disclosure.

In a possible embodiment of the present disclosure, as shown in FIG. 2, the display processing method includes the following steps 201-204.

Step 201: obtaining model information about an image model in a to-be-displayed image.

In the embodiment of the present disclosure, the to-be-displayed image is a static image or a dynamic image. Correspondingly, the image model is a static image model or a dynamic image model. The image model includes at least one attribute set.

The attribute set refers to a set of triangular faces with a same attribute. Illustration is further given by way of an example that materials of triangular faces are used as features for dividing the attribute sets. In this way, each attribute set is also called a material set, and the triangular faces in a same material set have a same material.

Obviously, in some other embodiments of the present disclosure, the attribute sets may also be divided in accordance with colors or positions of the triangular faces.

Each material set includes a plurality of triangular faces forming the image model, i.e., each image model actually is formed by a plurality of small-size triangular faces. In the embodiment of the present disclosure, one or more material sets are configured, so as to facilitate the management of these triangular faces.

It should be understood that, different parts of one image model may be the same or slightly different. In the embodiment of the present disclosure, the same triangular faces belong to the same material set.

In other words, when all triangular faces forming the image model have the same material, a material set may be configured to include these triangular faces. When the triangular faces forming the image model have two or more materials, a plurality of material sets is configured accordingly, and the triangular faces having the same material are in a same material set.

Data in the material set may probably include other data related to an attribute of each triangular face. To be specific, the data includes, but not limited to, names of materials set, material-related parameters and coordinate-related parameters. For example, the material-related parameters may include an ambient-light coefficient, a diffuse reflectance coefficient of a material, a specular reflection coefficient, a natural-light coefficient, a smoothness coefficient, a map file, etc. The coordinate-related parameters include a parameter related to coordinates of vertices of each triangular face, a vertex normal-related parameter, a texture-related parameter, a face normal-related parameter, etc.

Step 202: traversing coordinate information about vertices of each triangular face in each material set according to association relationship among the material sets.

In the embodiments of the present disclosure, a data structure of the model information further includes the association relationship among the material sets, and the association relationship is used to index the material sets, so as to traverse the data in each material set, specifically to track the coordinate information about each vertex of each triangular face for the material set.

Step 203: generating display data for the display panel at each phase in accordance with the coordinate information about the vertices of each triangular face.

After determining the coordinate information about the vertices of each triangular face, the display data for the display panel at each phase may be obtained in combination with phase information about the display panel.

In some embodiments of the present disclosure, Step 203 specifically includes: determining an intersection line of the display panel with the triangular face at each phase in accordance with sign information about the triangular face; and generating the display data for the display panel at a corresponding phase in accordance with the intersection line.

Figure 3:
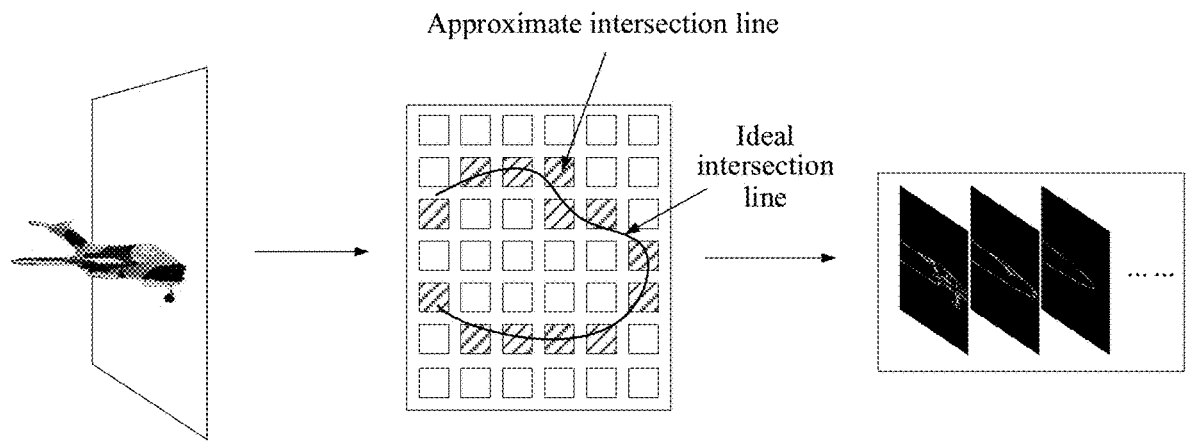
FIG. 3 is a schematic diagram showing intersection lines between a phase and an image model according to an embodiment of the present disclosure.

As shown in FIG. 3, at first, a cross-section equation at each phase is determined, and then an intersection set is obtained in accordance with the cross-section equation and the data of the image model. This intersection set is just an intersection line of a cross section of each phase with the image model, and in the embodiments of the present disclosure, the intersection set is also called an ideal intersection line.

Pixels on the display panel are discrete, so it is difficult for the image displayed by the pixels on the display panel to completely coincide with the ideal intersection line. Hence, it is necessary to further fit the ideal intersection line in accordance with the distribution of the pixels on the display panel, and a fitting result is just an actual display effect, which is also called an approximate intersection line in the embodiments of the present disclosure.

Step 204: displaying an image in accordance with the display data at each phase when the display panel is at the each phase.

Referring to FIG. 3 again, after determining the approximate intersection line corresponding to each phase, the approximate intersection lines of all phases are ranked in accordance with an order of the phases, i.e., an order of rotation angles, and when the display panel is at a given phase, a corresponding image is displayed. For example, when the display panel rotates to a first phase, an image corresponding to the first phase is displayed by the display panel, and when the display panel rotates to a second phase, an image corresponding to the second phase is displayed by the display panel, and so on. In this way, a 3D image is displayed through the rotatable 3D display device.

According to the embodiments of the present disclosure, based on the association relationship among the material sets, the meshing operation merely needs to be performed once on the image model, the intersection line of the image at each phase may be obtained, i.e., the display data for the display panel at each phase may be obtained. As a result, it is able to reduce the data processing load and improve the processing efficiency for the display data.

In some embodiments of the present disclosure, the image model includes N material sets, where N is a positive integer.

In the embodiments of the present disclosure, the Step 202 includes: determining a root node of the image mode; indexing a first material set in accordance with index relationship between the root node and the first material set, and obtaining coordinate information about vertices of each triangular face in the first material set; and in the case that N is greater than, indexing an $M^{th}$ material set in accordance with index information in an $(M-1)^{th}$ material set, and obtaining coordinate information about vertices of each triangular face in the $M^{th}$ material set, and so on, until the coordinate information about the vertices of the triangular faces in all the material sets is obtained, where M is a positive integer smaller than or equal to N and greater than 1.

In the embodiments of the present disclosure, the association relationship among the material sets includes association relationship between the root node and the material set. At an initial stage of traversing the material sets, the first material set is indexed by the root node, so as to obtain the coordinate information about the vertices of each triangular face in the first material set. The first material set refers to a material set directly associated with the root node.

Figure 4A:
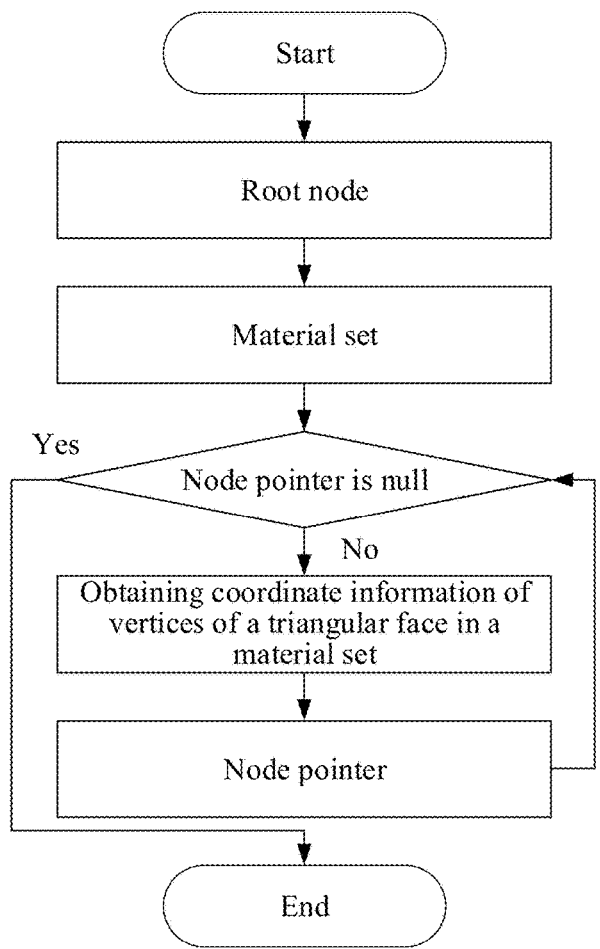
FIG. 4A is another flowchart of a display processing method according to an embodiment of the present disclosure.

As shown in FIG. 4A, in case that there is one material set, i.e., in case that N is 1, all the material sets have been traversed actually after the first material set is traversed.

Referring to FIG. 4A again, in case that there are more than one material sets, i.e., in case that N is greater than 1, the association relationship among the material sets further includes association relationship among different material sets. To be specific, each material set is provided with a node pointer pointing to a next material set, and a node pointer of the last material set is null. In this way, after one material set has been traversed and the coordinate information about the vertices of each triangular face in the material set has been obtained, the next material set is indexed in accordance with the node pointer, and so on, until the material set with the null node pointer is indexed. At this time, all the material sets have been traversed, and the coordinate information about the vertices of each triangular face in all the material sets has been obtained. Further, information related to the image model, e.g., a normal vector, a plane normal line and a vertex normal, may be further obtained.

In this way, in the embodiments of the present disclosure, the first material set is indexed through the root node in accordance with the association relationship among the material sets, and then the other material sets are indexed, so as to reduce a work load and improve the data processing efficiency.

It should be understood that, when the to-be-displayed image is a static image, the image model in the to-be-displayed image is a static model. During a plurality of revolutions of the display panel, the same image is displayed by the display panel at the same position. Hence, when the display panel has moved to a given phase, a specific image is displayed. When the to-be-displayed image is a dynamic image, the image model in the to-be-displayed image is a dynamic model. During a plurality of revolutions of the display panel, images displayed by the display panel at the same position may be different, so it is necessary to further adjust the image displayed by the display panel.

In some embodiments of the present disclosure, the image model includes a plurality of joint nodes. The traversing the coordinate information about the vertices of each triangular face in each attribute set further includes: obtaining animation frame information about the image model; calculating coordinate information about each joint node within each animation frame in accordance with the animation frame information; and calculating model coordinates of each vertex of each triangular face in accordance with the coordination information about the joint node.

Figure 4B:
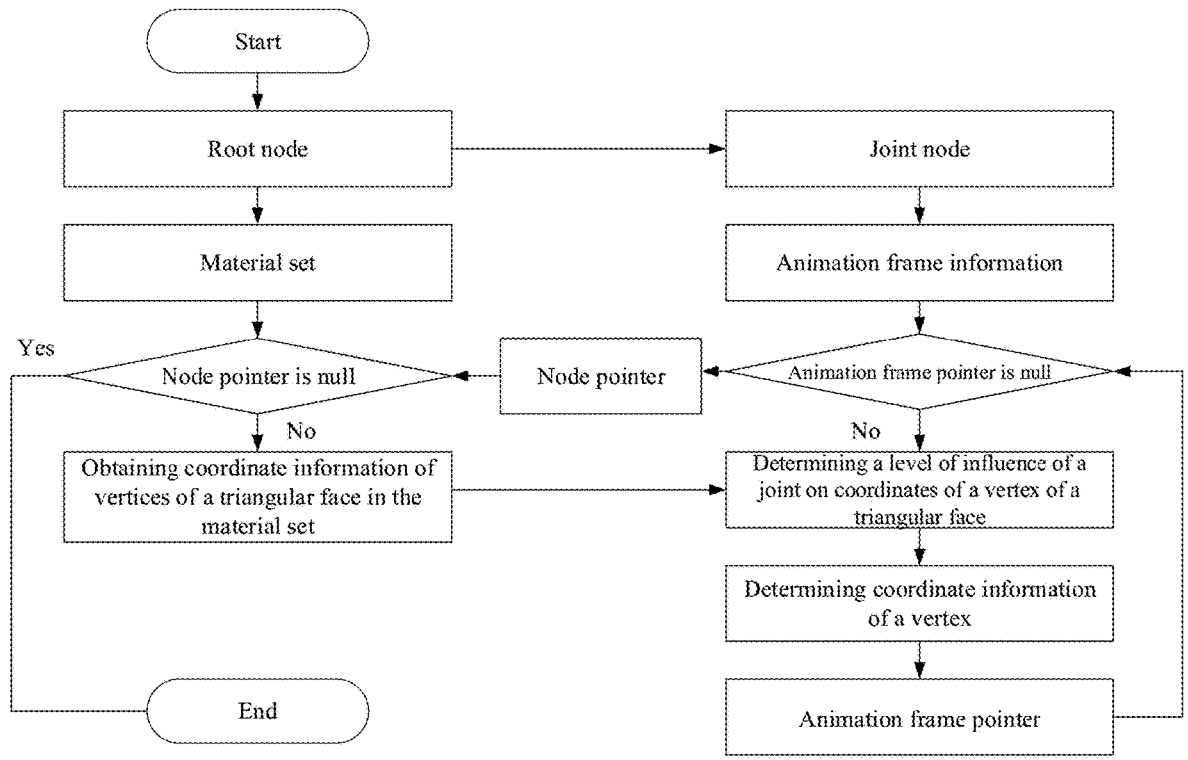
FIG. 4B is yet another flowchart of a display processing method according to an embodiment of the present disclosure.

As shown in FIG. 4B, in case that the image model is a dynamic model, in the embodiments of the present disclosure, the animation frame information is further obtained. The image model in each animation frame may be understood as a static model. Through obtaining different animation frame information, it is able to obtain position change information of each joint node within different animation frames.

After determining the position change information of each joint node within different animation frames, the coordinates of the vertices of each triangular face are calculated in accordance with association relationship between the joint node and the vertices of the triangular face, and then the model coordinates of each vertex of the triangular face are determined.

Further, in a possible embodiment of the present disclosure, the image model in the to-be-displayed image is a dynamic model and includes bones and skins, each bone is located between two adjacent joint nodes, and the skin is bound to the bone and is composed of at least one material set. The calculating the model coordinates of each vertex of each triangular face in accordance with the coordinate information about the joint node includes: determining coordinate information about each bone in accordance with the coordinate information about the joint node; and calculating the coordinate information about each vertex of each triangular face in accordance with the coordinate information about the bone and based on binding relationship between the skin and the bone.

During implementation, at first the material set is indexed in accordance with the root node, and the information related to the triangular faces in the material set is obtained. In the embodiments of the present disclosure, the joint nodes further need to be indexed, the animation frame information is obtained, and a position of each joint node is calculated in accordance with the animation frame information. Next, a level of influence of the joint on the vertices of the triangular face is determined in accordance with association relationship among the joints, the bones and the triangular faces. Then, the coordinate information about the vertices of the triangular face is updated in accordance with the influence of the joint on the positions of the vertexes of the triangular face.

The animation frame information at least includes a time point of the animation frame, a serial number of the animation frame, joint nodes in the animation frame, transform relationship T_anim between adjacent joint nodes, and an animation frame pointer pointing to a next animation frame. When the animation frame is the last frame, the animation frame pointer is null.

Figure 5A:
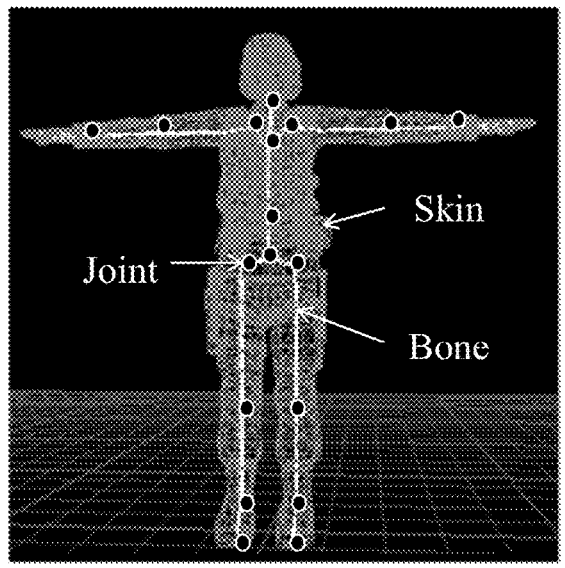
FIG. 5A is a schematic diagram of an image model according to an embodiment of the present disclosure.

As shown in FIG. 5A, the bone may be understood as a framework having a fixed attribute and located between two joint nodes. Hence, after determining the coordination information about each joint node, the position change information about the bone between the joint nodes can be determined correspondingly.

Figure 5B:
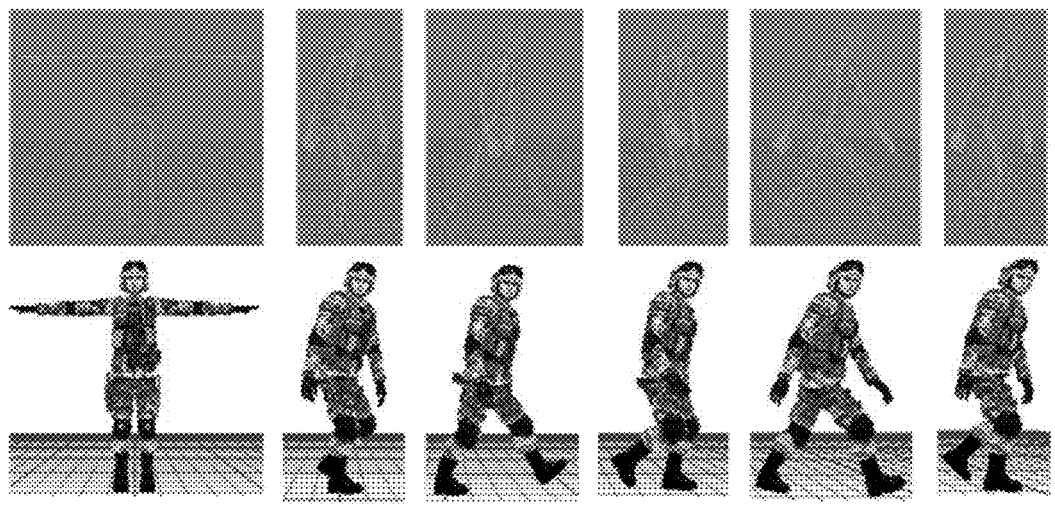
FIG. 5B is another schematic diagram of an image model according to an embodiment of the present disclosure.

As shown in FIGS. 5A and 5B, the skin is bound to the bone. Hence, after determining the position change information about the bone, position change information about the skin is determined in accordance with movement information about the bone. During the implementation, a bone affecting each part of the skin is determined in accordance with position relationship between the skin and the bone, and then updating a position of the skin is determined in accordance with the position change information about the bone.

In the embodiments of the present disclosure, joint information in the display data at least includes node information about a joint, a joint name and a serial number of the joint. Further, there may exist association relationship and master-slave relationship among the joints. When there is an upper-level joint or a parent joint for a joint, the joint information further includes information about the parent node, and transform relationship T_pc between the joint and the parent joint. The skin is bound to the bone, i.e., there is binding relationship between the coordinates of the vertices of the triangular face and the joint, and transform relationship between the coordinates of the vertices and the joint is marked as T_cv. Transform relationship between the joint and the model coordinates is marks as T_mc.

Figure 5C:
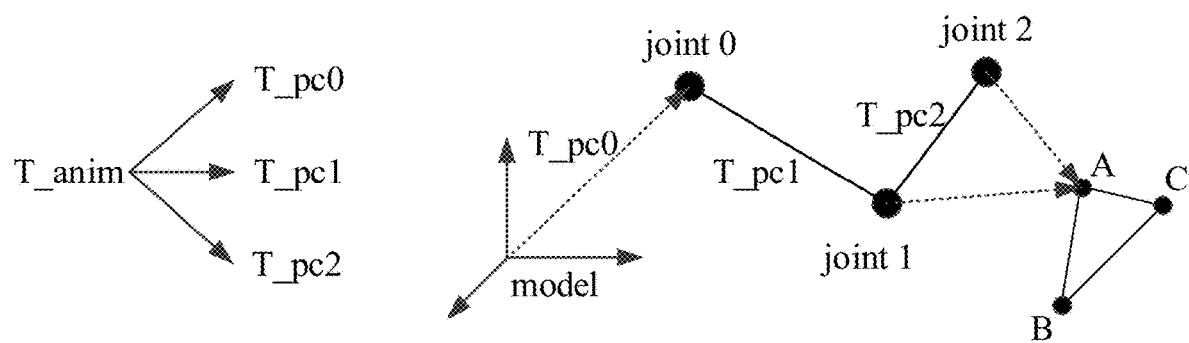
FIG. 5C is a schematic diagram of association relationship among joints according to an embodiment of the present disclosure.

As shown in FIG. 5C, illustrated is an example that there are three joints, i.e., joint0 to joint2, and these three joints are associated sequentially. During the implementation, values of transform relationships between the adjacent joints, i.e., T_pc0, T_pc1 and T_pc2, are updated in accordance with the transform relationship T_anim between adjacent joints. Then, the transform relationship between each joint and the model coordinates is obtained, and is expressed as $$\begin{cases} T\_mc0 = T\_pc0 \\ T\_m1 = T\_pc0 \times T\_pc1 \\ T\_mc2 = T\_pc0 \times T\_pc1 \times T\_pc2 \end{cases} \quad (1)$$

Based on the association relationship between the skin and the bone, a vertex-to-joint coordinate transform parameter T_cv and a joint-to-model coordinate transform parameter T_mc are extracted, and then the position of each vertex is updated through the above formula (1).

As shown in FIG. 5C, in a possible embodiment of the present disclosure, a skin includes a triangular face ABC, a joint index joint_indices bound to a vertex A is [1, 2], i.e., joint1 and joint2 in FIG. 5C, and a weight joint_weights is [m, n]. Here, the weight refers to a level of influence of the joint on the vertex, and is specifically determined in accordance with the association relationship between the joint and the vertex. Two transform matrices of the joint1 are T_mc1 and T_cv1, respectively, and two transform matrices of joint2 are T_mc2 and T_cv2, respectively, so model coordinates of the vertex A may be tracked and updated through following formula (2):

$$p\_model1 = \quad (2)$$
$$(T\_mc1 \times T\_cv1 \times m + T\_mc2 \times T\_cv2 \times n) \times p\_model0,$$

where p_model0 and p_model1 represent model coordinates of the vertex A before updating and model coordinates of the vertex A after updating, respectively.

In some embodiments of the present disclosure, the coordinate information includes model coordinates, scene coordinates, device coordinates and sign information.

Step 202 includes: determining device coordinates of each vertex of each triangular face, the device coordinates being coordinates in a device coordinate system established on the basis of the rotatable 3D display device; and generating sign information about each vertex in accordance with phase information about the display panel and the device coordinates.

It should be understood that, relative positional relationship between the phase of the display panel and the image model is determined through a device coordinate system established on the basis of the rotatable 3D display device. Hence, in the embodiments of the present disclosure, the device coordinates of the vertices of the triangular face are determined first, and then the sign information about each vertex of the triangular face is determined in accordance with the phase information about the display panel.

In a possible embodiment of the present disclosure, the determining the device coordinates of each vertex of each triangular face includes: obtaining model coordinates of each vertex of each triangular face, the model coordinates being coordinates in an image model coordinate system; calculating scene coordinates of each vertex of each triangular face in accordance with the model coordinates, the scene coordinates being coordinates in an image scene coordinate system; and calculating the device coordinates of each vertex of each triangular face in accordance with the scene coordinates.

In the embodiments of the present disclosure, the model coordinates are coordinates in the image model coordinate system, i.e., a coordinate system established separately on the basis of the image model, and are used to mainly reflect a relative position of a vertex in the image model. The scene coordinates are coordinates in the image scene coordinate system, and are used to reflect a relative position of the image model in a scene. The device coordinates are coordinates in a device coordinate system established on the basis of the rotatable 3D display device, and are used to reflect a position of the vertex relative to a hardware device, e.g., the display panel or the rotating shaft. To be specific, the device coordinates are calculated through the following formula:

$$p\_device = T\_ds \times p\_scene = T\_ds \times T\_sm \times p\_model, \quad (3)$$

where p_model represents the model coordinates, T_sm represents transform relationship between the model coordinates and the scene coordinates, p_scene represents the scene coordinates, T_ds represents transform relationship between the scene coordinates and the device coordinates, and p_device represents the device coordinates.

Figure 6A:
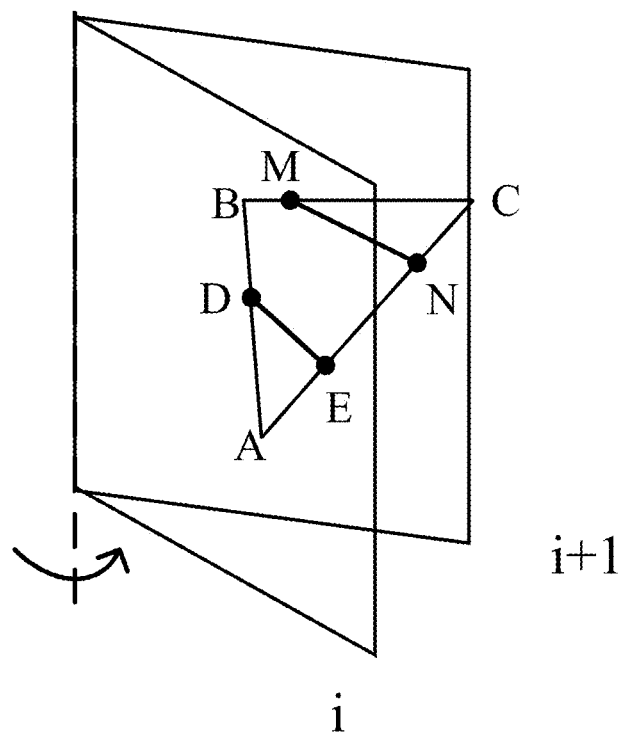
FIG. 6A is a schematic diagram of a scenario of a display state according to an embodiment of the present disclosure.
Figure 6B:
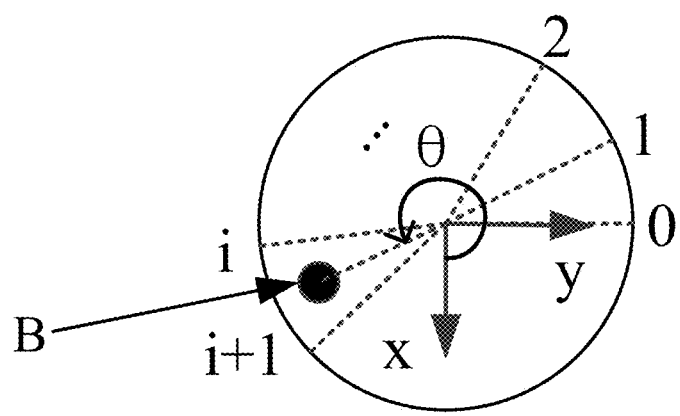
FIG. 6B is another schematic view of a scenario of a display state according to an embodiment of the present disclosure.

After determining the device coordinates, the sign information is further generated in accordance with the device coordinates. As shown in FIGS. 6A and 6B, the sign information is used to mark positional relationship between each vertex of the triangular face and each phase of the display panel during rotation.

In FIG. 6A, ABC represents a triangular face, and merely adjacent phases i and i+1 are shown. Referring to FIGS. 6A and 6B, a vertex B is arranged between the phase i and the phase i+1 and is marked as B (i, 1+1) in this embodiment. Similarly, the vertex A is marked as A (i−1, 1), and a vertex C is marked as C (i+1, 1+2). In this way, it is able to determine the sign information about each vertex.

During implementation, a deflection angle θ of each vertex is calculated through the following formula (4):

$$\begin{cases} \theta = \arctan\left(\frac{p\_device.y}{p\_device.x}\right) \\ p\_sign = \left[\text{floor}\left(\frac{\theta}{2\pi} \times \text{sections}\right), \text{floor}\left(\frac{\theta}{2\pi} \times \text{sections}\right) + 1\right] \end{cases}, \quad (4)$$

and then the mark information p_sign is calculated in accordance with the deflection angle θ. In the above formula (4), p_decive.y and p_device.x represent an ordinate y and an abscissa x in a scene coordinate system xoy in FIG. 6B respectively, and sections represents the total quantity of phases. For example, in the embodiments of the present disclosure, every 2° represents a phase, i.e., there are 180 phases totally, so a value of sections is 180. In addition, floor ( ) represents a round-down function. Hence, the mark information about each vertex may be calculated through the above formula.

After determining the sign information about each vertex of each triangular face, information about a phase intersecting the triangular face is determined. As shown in FIG. 6A, the sign information about the vertices of the triangular face ABC is A (i−1, 1), B (I, 1+1), and C (i+1, 1+2), so a side AB of the triangular face ABC passes through the phase i, a side AC passes through the phases i and i+1, and a side BC passes through the phase i+1. At this time, there are two intersections points, i.e., D and E, between the sides of the triangular face ABC and the phase i, and there are two intersection points, i.e., M and N, between the sides of the triangular face ABC and the phase i+1. Hence, an ideal intersection line between the triangular face and the phase i is a line DE, and an ideal intersection line between the triangular face and the phase i+1 is a line MN.

The present disclosure further provides in some embodiments a display processing device applied to a rotatable 3D display device. The rotatable 3D display device includes a rotatable display panel and a rotating shaft. The display panel is arranged onto the rotating shaft and is rotatable around the rotating shaft.

Figure 7:
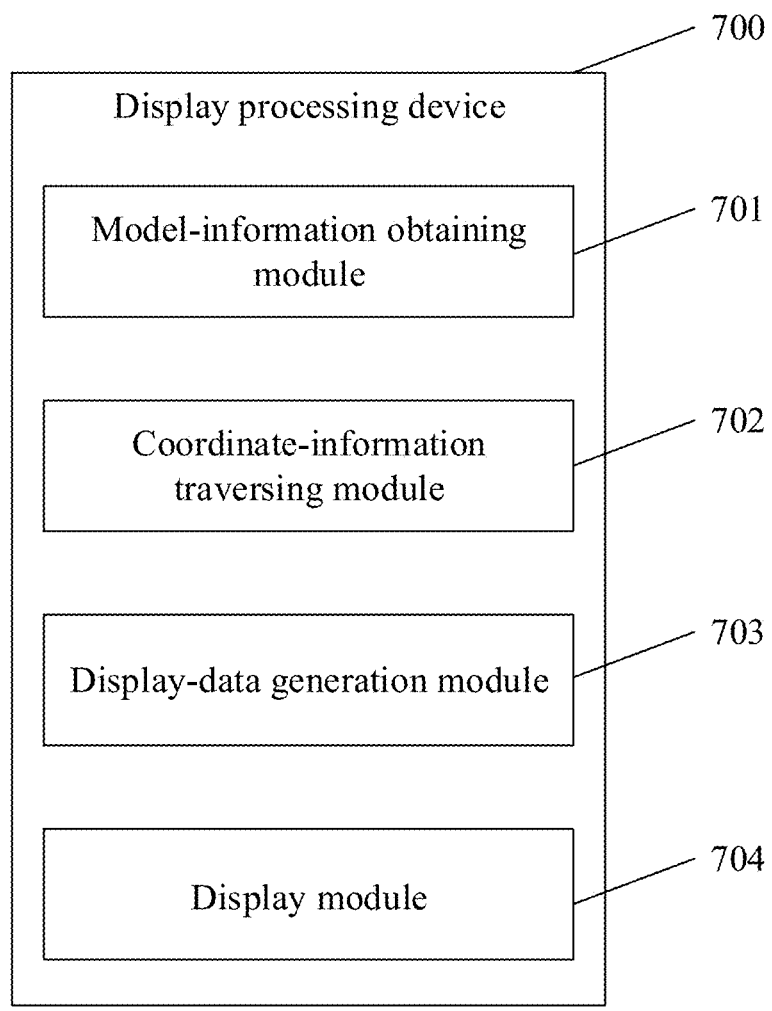
FIG. 7 is a schematic diagram of a display processing device according to an embodiment of the present disclosure.

As shown in FIG. 7, the display processing device 700 includes: a model-information obtaining module 701 configured to obtain model information about an image model in a to-be-displayed image, the image model including at least one attribute set, each attribute set including a plurality of triangular faces for forming the image model; a coordinate-information traversing module 702 configured to traverse coordinate information about vertices of each triangular face in each attribute set in accordance with association relationship among the attribute sets; a display-data generation module 703 configured to generate display data for the display panel at each phase in accordance with the coordinate information about the vertices of each triangular face; and a display module 704 configured to display an image in accordance with the display data at each phase when the display panel is at the phase.

In some embodiments of the present disclosure, the attribute set is a material set, and the triangular faces in each material set have the same material attribute.

In some embodiments of the present disclosure, the image model includes N attribute sets, where N is a positive integer. The coordinate-information traversing module 702 includes: a root-node determination sub-module configured to determine a root node of the image model; and an indexing sub-module configured to index a first attribute set in accordance with index relationship between the root node and the first attribute set, and obtain coordinate information about vertices of each triangular face in the first attribute set. The indexing sub-module is further configured to, in the case that N is greater than 1, index an $M^{th}$ attribute set in accordance with index information in an $(M-1)^{th}$ attribute set, and obtain coordinate information about vertices of each triangular face in the $M^{th}$ attribute set, and so on, until the coordinate information about the vertices of the triangular faces in all the attribute sets have been obtained, where M is a positive integer smaller than or equal to N and greater than 1.

In some embodiments of the present disclosure, the image model in the to-be-displayed image is a dynamic model and includes a plurality of joint nodes. The coordinate-information traversing module 702 further includes: an obtaining sub-module configured to obtain animation frame information about the image model; a coordinate-information calculation sub-module configured to calculate coordinate information about each joint node within each animation frame in accordance with the animation frame information; and a model-coordinate calculation sub-module configured to calculate model coordinates of each vertex of each triangular face in accordance with the coordination information about the joint node.

In some embodiments of the present disclosure, the image model further includes bones and skins, each bone is located between two adjacent joint nodes, and the skin is bound to the bone and includes at least one of the attribute sets. The model-coordinate calculation sub-module includes: a bone-coordinate calculation unit configured to determine coordinate information about each bone in accordance with the coordinate information about the joint node; and a vertex-coordinate calculation unit configured to calculate the coordinate information about each vertex of each triangular face in accordance with the coordinate information about the bone and based on binding relationship between the skin and the bone.

In some embodiments of the present disclosure, the coordinate-information traversing module 702 includes: a device-coordinate calculation sub-module configured to determine device coordinates of each vertex of each triangular face, the device coordinates being coordinates in a device coordinate system established on the basis of the rotatable 3D display device; and a sign-information generation sub-module configured to generate sign information about each vertex in accordance with phase information about the display panel and the device coordinates, the sign information being used to mark positional relationship between each vertex of the triangular face and each phase of the display panel during rotation.

In some embodiments of the present disclosure, the device-coordinate calculation sub-module includes: a model-coordinate obtaining unit configured to obtain model coordinates of each vertex of each triangular face, the model coordinates being coordinates in an image model coordinate system; a scene-coordinate calculation unit configured to calculate scene coordinates of each vertex of each triangular face in accordance with the model coordinates, the scene coordinates being coordinates in an image scene coordinate system; and a device-coordinate calculation unit configured to calculate the device coordinates of each vertex of each triangular face in accordance with the scene coordinates.

In some embodiments of the present disclosure, the display-data generation module 703 includes: an intersection-line determination sub-module configured to determine an intersection line of the display panel with the triangular face at each phase in accordance with the sign information about the triangular face; and a display-data generation sub-module configured to generate the display data for the display panel at a corresponding phase in accordance with the intersection line.

The present disclosure further provides in some embodiments an electronic device including a processor, a memory, and a computer program stored on the memory and executable by the processor. The computer program is executed by the processor so as to implement the steps of the above-mentioned display processing method.

The present disclosure further provides in some embodiments a computer-readable storage medium storing thereon a computer program. The computer program is executed by a processor so as to implement the steps of the above-mentioned display processing method.

The present disclosure further provides in some embodiments a display system including a rotatable 3D display device and the above-mentioned display processing device 700. The rotatable 3D display device includes a display panel arranged to be rotatable, and the display processing device is configured to control the rotatable 3D display device to display an image.

According to the embodiments of the present disclosure, based on the association relationship among the material sets, the mesh processing merely needs to be performed on the image model once, to obtain the intersection lines of the image at each phase, i.e., obtain the display data for the display panel at each phase. As a result, it is able to reduce the data processing load and improve the processing efficiency of the display data.

It should be appreciated by those skilled in the art that, units and steps described in the embodiments of the present disclosure may be implemented in the form of electronic hardware, or a combination of a computer program and the electronic hardware. Whether or not these functions are executed by hardware or software depends on specific applications or design constraints of the technical solutions. Different methods may be adopted by skilled professionals for the specific applications so as to implement the described functions. This implementation should not be considered to go beyond the scope of the present disclosure.

Those skilled in the art may clear understand that, for convenience and clarification, operation procedures of the system, device and units described hereinabove may refer to the corresponding procedures in the method embodiments, and thus will not be particularly defined herein.

It should be further appreciated that, the device and the method disclosed in the embodiments of the present disclosure may be implemented in any other ways. For example, the device embodiments are merely for illustrative purposes. For example, divisions to units are only logical division; during the actual application, another division is possible, for example, some modules or units may be combined together or integrated into another system, or some functions of the module or units may be omitted or not executed. In addition, coupling connection, direct coupling connection or communication connection between the modules or units may be implemented via interfaces, and the indirect coupling connection or communication connection between the modules or the units may be implemented in an electrical or mechanical form or in any other form.

The units described as separate elements may be, or may not be, physically separated from each other. The units displayed as elements may be, or may not be, physical units, i.e., they may be arranged at an identical position, or distributed on a plurality of network elements. Parts or all of the units may be selected in accordance with the practical need, so as to achieve the purpose of the technical solutions of the present disclosure.

In addition, functional units in the embodiments of the present disclosure may be integrated into a processing unit, or the functional units may exist independently, or two or more functional units may be integrated into one unit.

In the case that the functional units are implemented in a software form and sold or used as a separate product, they may be stored in a computer-readable medium. Based on this, the technical solutions of the present disclosure, partial or all, or parts of the technical solutions of the present disclosure contributing to the related art, may appear in the form of software products, which may be stored in a storage medium and include several instructions so as to enable computer (which may be a personal computer, a server or network equipment, or the like) to execute all or parts of the steps of the method according to the embodiments of the present disclosure. The storage medium includes any medium capable of storing therein program codes, e.g., a flash disk, a mobile hard disk, a read-only memory (ROM), a random access memory (RAM), a magnetic disk or an optical disk.

The above embodiments are specific embodiments of the present disclosure, but the present disclosure is not limited thereto. Obviously, a person skilled in the art may make further modifications or substitutions within the technical scope disclosed by the present disclosure, and these modifications and substitutions all fall within the scope of the present disclosure. The protection scope of the present disclosure should be consistent with the protection scope of the claims.

The invention claimed is:

1. A display processing method applied to a rotatable three-dimensional display device, the rotatable three-dimensional display device comprising a rotatable display panel, the display processing method comprising:
   obtaining model information about an image model in a to-be-displayed image, wherein the image model comprises one or more attribute sets, each of the one or more attribute sets comprises a plurality of triangular faces constituting the image model;
   traversing coordinate information about vertices of each triangular face in each attribute set in accordance with association relationship among the attribute sets;
   generating display data for the display panel at each phase in accordance with the coordinate information about the vertices of each triangular face; and
   displaying an image in accordance with the display data at each phase when the display panel is at each phase;
   wherein the image model comprises N attribute sets, N is a positive integer,
   traversing the coordinate information about the vertices of each triangular face in each attribute set comprises:
   determining a root node of the image mode;
   indexing a first attribute set in accordance with index relationship between the root node and the first attribute set, and obtaining coordinate information about vertices of each triangular face in the first attribute set; and
   in case that N is greater than 1, indexing an $M^{th}$ attribute set in accordance with index information comprised in an $(M-1)^{th}$ attribute set, and obtaining coordinate information about vertices of each triangular face in the $M^{th}$ attribute set, and obtaining the coordinate information about the vertices of the triangular faces in all the attribute sets, M is a positive integer smaller than or equal to N and greater than 1.

2. The display processing method according to claim 1, wherein the attribute set is a material set, and triangular faces in each material set have a same material attribute.

3. The display processing method according to claim 1, wherein the image model in the to-be-displayed image is a dynamic model and comprises a plurality of joint nodes,
   traversing the coordinate information about the vertices of each triangular face in each attribute set further comprises:
   obtaining animation frame information about the image model;
   calculating coordinate information about each joint node within each animation frame in accordance with the animation frame information; and
   calculating model coordinates of each vertex of each triangular face in accordance with the coordination information about the joint node.

4. The display processing method according to claim 3, wherein the image model further comprises bones and skins, each of the bones is located between two adjacent joint nodes, and the skins are bound to the bones and are constituted by at least one of the attribute sets,
   calculating the model coordinates of each vertex of each triangular face in accordance with the coordinate information about the joint node comprises:
   determining coordinate information about each bone in accordance with the coordinate information about the joint node; and
   calculating the coordinate information about each vertex of each triangular face in accordance with the coordinate information about the bone and binding relationship between the skin and the bone.

5. The display processing method according to claim 1, wherein traversing the coordinate information about the vertices of each triangular face in each attribute set comprises:
   determining device coordinates of each vertex of each triangular face, the device coordinates being coordinates in a device coordinate system established on basis of the rotatable three-dimensional display device; and
   generating sign information about each vertex in accordance with phase information about the display panel and the device coordinates, the sign information being configured to mark positional relationship between each vertex of the triangular face and each phase of the display panel during rotation.

6. The display processing method according to claim 5, wherein determining the device coordinates of each vertex of each triangular face comprises:
   obtaining model coordinates of each vertex of each triangular face, the model coordinates being coordinates in an image model coordinate system;
   calculating scene coordinates of each vertex of each triangular face in accordance with the model coordinates, the scene coordinates being coordinates in an image scene coordinate system; and
   calculating the device coordinates of each vertex of each triangular face in accordance with the scene coordinates.

7. The display processing method according to claim 6, wherein generating the display data for the display panel at each phase in accordance with the coordinate information about the vertices of each triangular face comprises:
   determining an intersection line of the display panel with the triangular face at each phase in accordance with the sign information about the triangular face; and generating the display data for the display panel at a corresponding phase in accordance with the intersection line.

8. A display processing device for controlling a rotatable three-dimensional display device, the rotatable three-dimensional display device comprising a rotatable display panel, the display processing device comprising:
a processor, a memory, and a computer program stored on the memory and executable by the processor, wherein when the computer program is executed by the processor, the processor implements:
obtaining model information about an image model in a to-be-displayed image, wherein the image model comprises one or more attribute sets, each of the one or more attribute sets comprises a plurality of triangular faces constituting the image model;
traversing coordinate information about vertices of each triangular face in each attribute set in accordance with association relationship among the attribute sets;
generating display data for the display panel at each phase in accordance with the coordinate information about the vertices of each triangular face; and
displaying an image in accordance with the display data at each phase when the display panel is at each phase;
wherein the image model comprises N attribute sets, N is a positive integer,
traversing the coordinate information about the vertices of each triangular face in each attribute set comprises:
determining a root node of the image mode;
indexing a first attribute set in accordance with index relationship between the root node and the first attribute set, and obtaining coordinate information about vertices of each triangular face in the first attribute set; and
in case that N is greater than 1, indexing an Mth attribute set in accordance with index information comprised in an (M−1)th attribute set, and obtaining coordinate information about vertices of each triangular face in the Mth attribute set, and obtaining the coordinate information about the vertices of the triangular faces in all the attribute sets, M is a positive integer smaller than or equal to N and greater than 1.

9. A non-transitory computer-readable storage medium storing therein a computer program, wherein when the computer program is executed by a processor, the processor implements:
obtaining model information about an image model in a to-be-displayed image, wherein the image model comprises one or more attribute sets, each of the one or more attribute sets comprises a plurality of triangular faces constituting the image model;
traversing coordinate information about vertices of each triangular face in each attribute set in accordance with association relationship among the attribute sets;
generating display data for the display panel at each phase in accordance with the coordinate information about the vertices of each triangular face; and
displaying an image in accordance with the display data at each phase when the display panel is at each phase;
wherein the image model comprises N attribute sets, N is a positive integer,
traversing the coordinate information about the vertices of each triangular face in each attribute set comprises:
determining a root node of the image mode;
indexing a first attribute set in accordance with index relationship between the root node and the first attribute set, and obtaining coordinate information about vertices of each triangular face in the first attribute set; and
in case that N is greater than 1, indexing an Mth attribute set in accordance with index information comprised in an (M−1)th attribute set, and obtaining coordinate information about vertices of each triangular face in the Mth attribute set, and obtaining the coordinate information about the vertices of the triangular faces in all the attribute sets, M is a positive integer smaller than or equal to N and greater than 1.

10. A display system, comprising:
a rotatable three-dimensional display device and the display processing device according to claim 8, wherein the rotatable three-dimensional display device comprises a rotatable display panel, and the display processing device is configured to control the rotatable three-dimensional display device to display an image.

11. The display processing device according to claim 8, wherein the attribute set is a material set, and triangular faces in each material set have a same material attribute.

12. The display processing device according to claim 8, wherein the image model in the to-be-displayed image is a dynamic model and comprises a plurality of joint nodes,
traversing the coordinate information about the vertices of each triangular face in each attribute set further comprises:
obtaining animation frame information about the image model;
calculating coordinate information about each joint node within each animation frame in accordance with the animation frame information; and
calculating model coordinates of each vertex of each triangular face in accordance with the coordination information about the joint node.

13. The display processing device according to claim 12, wherein the image model further comprises bones and skins, each of the bones is located between two adjacent joint nodes, and the skins are bound to the bones and are constituted by at least one of the attribute sets,
calculating the model coordinates of each vertex of each triangular face in accordance with the coordinate information about the joint node comprises:
determining coordinate information about each bone in accordance with the coordinate information about the joint node; and
calculating the coordinate information about each vertex of each triangular face in accordance with the coordinate information about the bone and binding relationship between the skin and the bone.

14. The display processing device according to claim 8, wherein traversing the coordinate information about the vertices of each triangular face in each attribute set comprises:
determining device coordinates of each vertex of each triangular face, the device coordinates being coordinates in a device coordinate system established on basis of the rotatable three-dimensional display device; and
generating sign information about each vertex in accordance with phase information about the display panel and the device coordinates, the sign information being configured to mark positional relationship between each vertex of the triangular face and each phase of the display panel during rotation.

15. The display processing device according to claim 14, wherein determining the device coordinates of each vertex of each triangular face comprises:
obtaining model coordinates of each vertex of each triangular face, the model coordinates being coordinates in an image model coordinate system;

calculating scene coordinates of each vertex of each triangular face in accordance with the model coordinates, the scene coordinates being coordinates in an image scene coordinate system; and calculating the device coordinates of each vertex of each triangular face in accordance with the scene coordinates.

16. The display processing device according to claim 15, wherein generating the display data for the display panel at each phase in accordance with the coordinate information about the vertices of each triangular face comprises:

determining an intersection line of the display panel with the triangular face at each phase in accordance with the sign information about the triangular face; and generating the display data for the display panel at a corresponding phase in accordance with the intersection line.

17. The non-transitory computer-readable storage medium according to claim 9, wherein the attribute set is a material set, and triangular faces in each material set have a same material attribute.

* * * * *